US010801333B2

(12) United States Patent
Jennings et al.

(10) Patent No.: US 10,801,333 B2
(45) Date of Patent: Oct. 13, 2020

(54) AIRFOILS, CORES, AND METHODS OF MANUFACTURE FOR FORMING AIRFOILS HAVING FLUIDLY CONNECTED PLATFORM COOLING CIRCUITS

(71) Applicant: United Technologies Corporation, Farmington, CT (US)

(72) Inventors: Timothy J. Jennings, West Hartford, CT (US); Tracy A. Propheter-Hinckley, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 131 days.

(21) Appl. No.: 15/954,857

(22) Filed: Apr. 17, 2018

(65) Prior Publication Data

US 2019/0316471 A1 Oct. 17, 2019

(51) Int. Cl.
*B22C 9/10* (2006.01)
*B22C 9/24* (2006.01)
(Continued)

(52) U.S. Cl.
CPC ................ *F01D 5/187* (2013.01); *B22C 9/10* (2013.01); *B22C 9/24* (2013.01); *B22D 25/02* (2013.01);
(Continued)

(58) Field of Classification Search
CPC .. B22C 9/10; B22C 9/103; B22C 9/24; B22D 19/00; B22D 25/02
(Continued)

(56) References Cited

U.S. PATENT DOCUMENTS 5,634,767 A 6/1997 Dawson
7,303,375 B2 12/2007 Cunha et al.
(Continued)

FOREIGN PATENT DOCUMENTS

EP 1216785 A2 6/2002
EP 1621727 A1 2/2006
(Continued)

OTHER PUBLICATIONS

European Search Report for European Application No. 19169644.2, International Filing Date Apr. 16, 2019, dated Oct. 8, 2019, 6 pages.

*Primary Examiner* — Kevin P Kerns
(74) *Attorney, Agent, or Firm* — Cantor Colburn LLP

(57) ABSTRACT

Methods for manufacturing airfoils of gas turbine engines are provided. The methods include forming a main body core, the main body core including a feed cavity core portion, the main body core configured to form at least a part of an airfoil including an airfoil body, a platform, and an attachment element, forming a platform circuit core having a platform core extension, wherein the platform circuit core is configured to form a cooling circuit in the platform, wherein at least one of the feed cavity core portion and the platform core extension includes a notch, assembling the platform circuit core to the main body core such that the platform core extension engages with the feed cavity core portion at the notch, casting an airfoil using the assembled platform circuit core and main body core, and removing a platform core extension element that is formed at the location of the notch.

14 Claims, 13 Drawing Sheets

650
700
702 Form main body core having a notch in at least one feed cavity core portion
704 Form platform circuit core having a platform core extension
706 Assemble platform circuit core to main body core with platform core extension inserted into notch
708 Cast airfoil body
710 Remove platform core extension element to fluidly connect a main body feed cavity to a formed platform cooling circuit
652 654 656 658 660 662 664

(51) Int. Cl.
*B22D 19/00* (2006.01)
*B22D 25/02* (2006.01)
*F01D 5/18* (2006.01)

(52) U.S. Cl.
CPC ...... *F05D 2230/21* (2013.01); *F05D 2240/81* (2013.01); *F05D 2260/202* (2013.01)

(58) Field of Classification Search
USPC ........................................... 164/369, 137, 98
See application file for complete search history.

(56) References Cited

U.S. PATENT DOCUMENTS

| | | | | |
|---|---|---|---|---|
| 8,517,666 | B2 | 8/2013 | Alvanos et al. | |
| 9,611,748 | B2 | 4/2017 | Kington et al. | |
| 9,702,252 | B2 | 7/2017 | Kanjiyani et al. | |
| 9,885,245 | B2 | 2/2018 | Crosatti et al. | |
| 2002/0108734 | A1* | 8/2002 | Beeck et al. ............ | B23P 15/04<br>164/76.1 |
| 2011/0142684 | A1 | 6/2011 | Campbell et al. | |
| 2013/0025123 | A1 | 1/2013 | Vetere et al. | |
| 2015/0369056 | A1 | 12/2015 | Spangler | |
| 2018/0187554 | A1* | 7/2018 | Hough et al. ........... | F01D 5/187 |

FOREIGN PATENT DOCUMENTS

| | | | |
|---|---|---|---|
| WO | 2014150301 | A1 | 9/2014 |
| WO | 2015057310 | | 4/2015 |

* cited by examiner

AIRFOILS, CORES, AND METHODS OF MANUFACTURE FOR FORMING AIRFOILS HAVING FLUIDLY CONNECTED PLATFORM COOLING CIRCUITS

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located within the airfoil body and located in other features or parts of the airfoil (e.g., platform, attachment elements, etc.). Manufacturing such airfoils may be difficult due to various constraints on the processes thereof, and thus airfoil designs may be impacted by the manufacturing constraints. Thus, improved processes for forming airfoils may be advantageous.

BRIEF DESCRIPTION

According to some embodiments, methods for manufacturing airfoils of gas turbine engines are provided. The methods include forming a main body core, the main body core including a feed cavity core portion, the main body core configured to form at least a part of an airfoil including an airfoil body, a platform, and an attachment element, forming a platform circuit core having a platform core extension, wherein the platform circuit core is configured to form a cooling circuit in the platform, wherein at least one of the feed cavity core portion and the platform core extension comprises a notch, assembling the platform circuit core to the main body core such that the platform core extension engages with the feed cavity core portion at the notch, casting an airfoil using the assembled platform circuit core and main body core, and removing a platform core extension element that is formed at the location of the notch.

In addition to one or more of the features described above, or as an alternative, further embodiments of the methods may include that a gap is formed between the platform core extension and the feed cavity core portion when engaged.

In addition to one or more of the features described above, or as an alternative, further embodiments of the methods may include that the platform core extension element is formed by material of the casting located within the gap.

In addition to one or more of the features described above, or as an alternative, further embodiments of the methods may include that the gap is between 0.015 inches and 0.050 inches.

In addition to one or more of the features described above, or as an alternative, further embodiments of the methods may include that the removal of the platform core extension element comprises a machining process.

In addition to one or more of the features described above, or as an alternative, further embodiments of the methods may include that removal of the platform core extension element fluidly connects a formed main body feed cavity and a formed platform cooling circuit.

In addition to one or more of the features described above, or as an alternative, further embodiments of the methods may include that the notch is formed in the feed cavity core portion and the platform core extension engages within the notch of the feed cavity core portion.

In addition to one or more of the features described above, or as an alternative, further embodiments of the methods may include that the notch is formed within the platform core extension and the feed cavity core portion engages within the notch of the platform core extension.

In addition to one or more of the features described above, or as an alternative, further embodiments of the methods may include that the feed cavity core portion comprises a reduced width portion that engages with the notch of the platform core extension.

According to some embodiments, core assemblies for forming airfoils of gas turbine engines are provided. The core assemblies include a main body core, the main body core including at least one feed cavity core portion, the main body core configured to form an airfoil including an airfoil body, a platform, and an attachment element and a platform circuit core having a platform core extension, wherein at least one of the feed cavity core portion and the platform core extension comprises a notch. The platform circuit core extension is engageable with the feed cavity core portion at the notch and a gap is formed between the platform circuit core extension and a surface of the feed cavity core portion at the notch.

In addition to one or more of the features described above, or as an alternative, further embodiments of the core assemblies may include that the gap is between 0.015 inches and 0.050 inches.

In addition to one or more of the features described above, or as an alternative, further embodiments of the core assemblies may include that the notch is formed in the feed cavity core portion and the platform core extension engages within the notch of the feed cavity core portion.

In addition to one or more of the features described above, or as an alternative, further embodiments of the core assemblies may include that the notch is formed within the platform core extension and the feed cavity core portion engages within the notch of the platform core extension.

In addition to one or more of the features described above, or as an alternative, further embodiments of the core assemblies may include that the feed cavity core portion comprises a reduced width portion that engages with the notch of the platform core extension.

According to some embodiments, airfoils of gas turbine engines are provided. The airfoils include an airfoil body extending from a platform and an attachment element, wherein at least one of the platform and the attachment element include at least one feed cavity and a platform cooling circuit formed within the platform, wherein the platform cooling circuit is fluidly connected to the at least one feed cavity at a platform cooling circuit bypass.

In addition to one or more of the features described above, or as an alternative, further embodiments of the airfoils may include that the platform cooling circuit comprises at least one platform cooling hole formed in the platform such that cooling air flows from the at least one feed cavity, through the platform cooling circuit bypass, through the platform cooling circuit, and out through the at least one platform cooling hole.

In addition to one or more of the features described above, or as an alternative, further embodiments of the airfoils may include that the airfoil body defines at least one main body cavity, wherein the main body cavity is fluidly connected to the at least one feed cavity.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
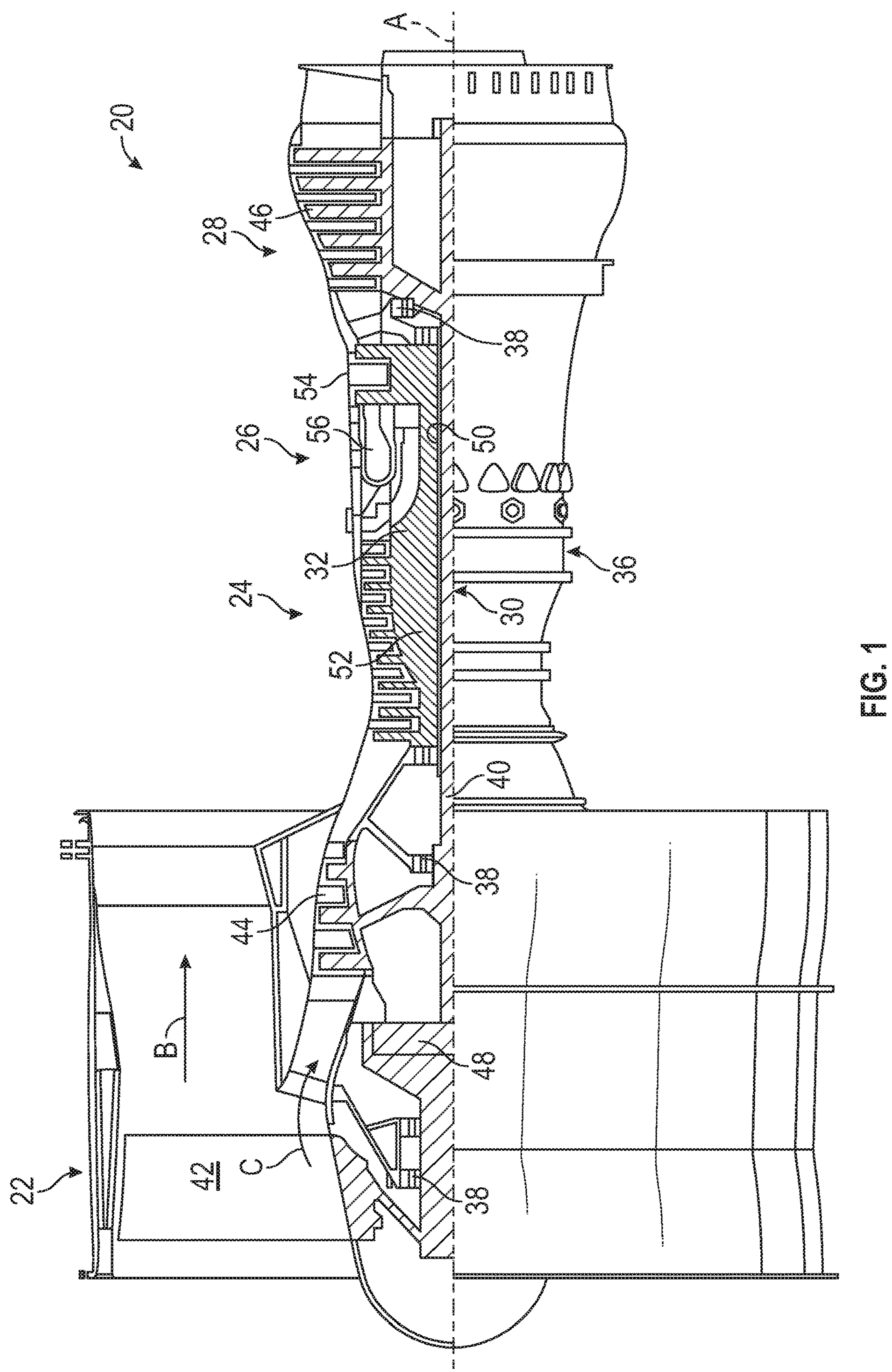
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 can be connected to the fan 42 through a speed change mechanism, which in exemplary gas turbine engine 20 is illustrated as a gear system 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the gear system 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The gear system 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram °R})/(514.7\text{°R})]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
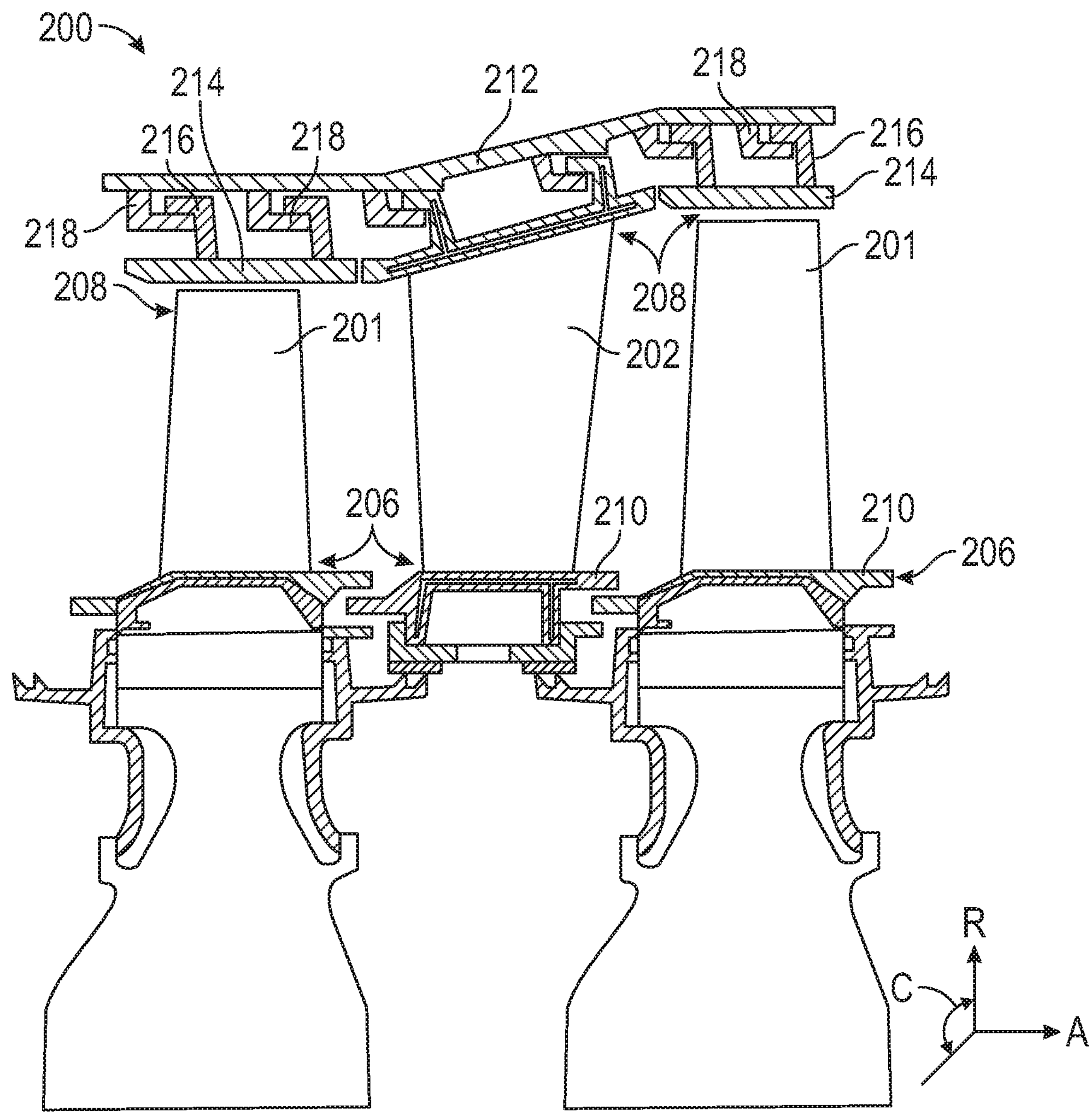
FIG. 2 is a schematic illustration of a portion of a turbine section of the gas turbine engine of FIG. 1.

FIG. 2 is a schematic view of a turbine section that may employ various embodiments disclosed herein. Turbine 200 includes a plurality of airfoils, including, for example, one or more blades 201 and vanes 202 (collectively "airfoils 201, 202"). The airfoils 201, 202 may be hollow bodies with internal cavities defining a number of channels or cavities, hereinafter airfoil cavities, formed therein and extending from an inner diameter 206 to an outer diameter 208, or vice-versa. The airfoil cavities may be separated by partitions or internal walls or structures within the airfoils 201, 202 that may extend either from the inner diameter 206 or the outer diameter 208 of the airfoil 201, 202, or as partial sections therebetween. The partitions may extend for a portion of the length of the airfoil 201, 202, but may stop or end prior to forming a complete wall within the airfoil 201, 202. Multiple of the airfoil cavities may be fluidly connected and form a fluid path within the respective airfoil 201, 202. The blades 201 and the vanes 202, as shown, are airfoils that extend from platforms 210 located proximal to the inner diameter thereof. Located below the platforms 210 may be airflow ports and/or bleed orifices that enable air to bleed from the internal cavities of the airfoils 201, 202. A root of the airfoil may connect to or be part of the platform 210. Such roots may enable connection to a turbine disc, as will be appreciated by those of skill in the art.

The turbine 200 is housed within a case 212, which may have multiple parts (e.g., turbine case, diffuser case, etc.). In various locations, components, such as seals, may be positioned between the airfoils 201, 202 and the case 212. For example, as shown in FIG. 2, blade outer air seals 214 (hereafter "BOAS") are located radially outward from the blades 201. As will be appreciated by those of skill in the art, the BOAS 214 can include BOAS supports that are configured to fixedly connect or attach the BOAS 214 to the case 212 (e.g., the BOAS supports can be located between the BOAS and the case). As shown in FIG. 2, the case 212 includes a plurality of hooks 218 that engage with the hooks 216 to secure the BOAS 214 between the case 212 and a tip of the blade 201.

As shown and labeled in FIG. 2, a radial direction R is upward on the page (e.g., radial with respect to an engine axis) and an axial direction A is to the right on the page (e.g., along an engine axis). Thus, radial cooling flows will travel up or down on the page and axial flows will travel left-to-right (or vice versa). A circumferential direction C is a direction into and out of the page about the engine axis.

Typically, airfoil cooling includes impingement cavities for cooling various hot surfaces of the airfoils. For example, it may be desirable to position a leading edge impingement cavity immediately adjacent to the external leading edge of the airfoil (e.g., left side edge of the airfoils 201, 202). The leading edge impingement cavity is typically supplied cooling airflow from impingement apertures which serve as conduits for cooling air that originates within the leading edge cooling cavities of the airfoil. Once in the leading edge impingement cavity, the cooling air flow is expelled through an array of shower head holes, thus providing increased convective cooling and a protective film to mitigate the locally high external heat flux along the leading edge airfoil surface.

Figure 3A:
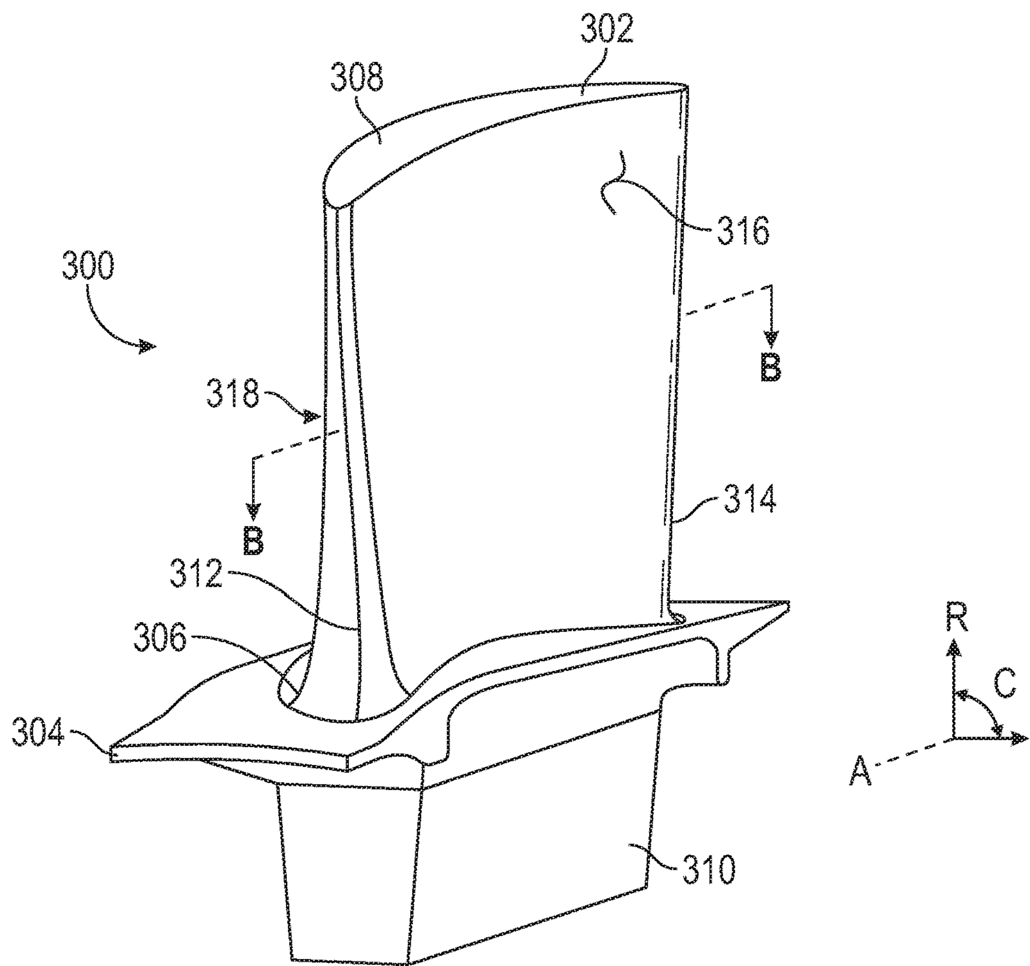
FIG. 3A is a perspective view of an airfoil that can incorporate embodiments of the present disclosure, as viewing a leading edge thereof.
Figure 3B:
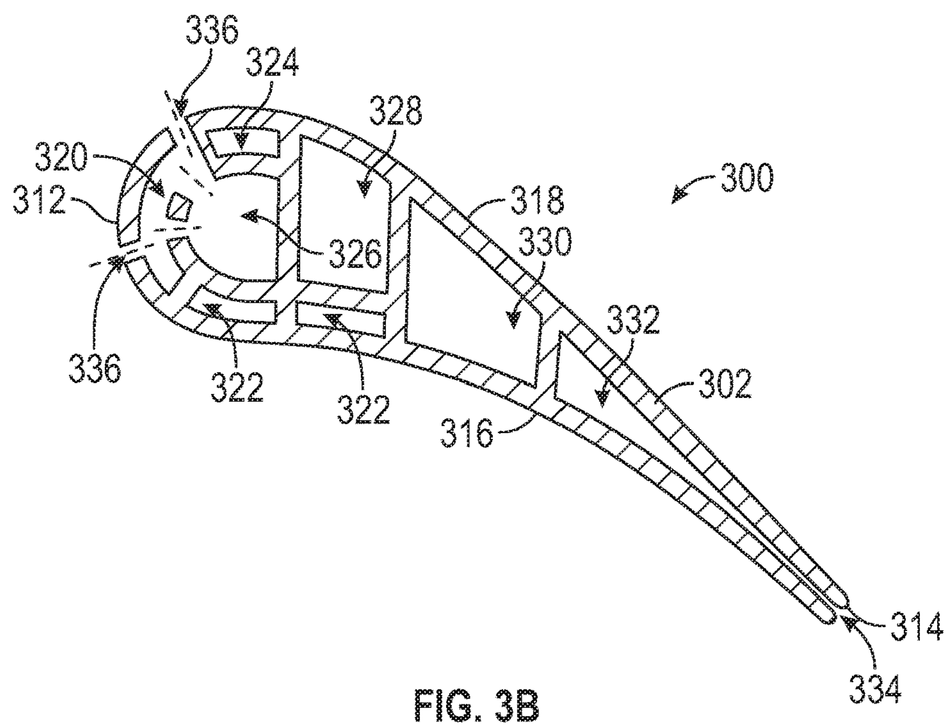
FIG. 3B is a partial cross-sectional view of the airfoil of FIG. 3A as viewed along the line B-B shown in FIG. 3A.
Figure 3C:
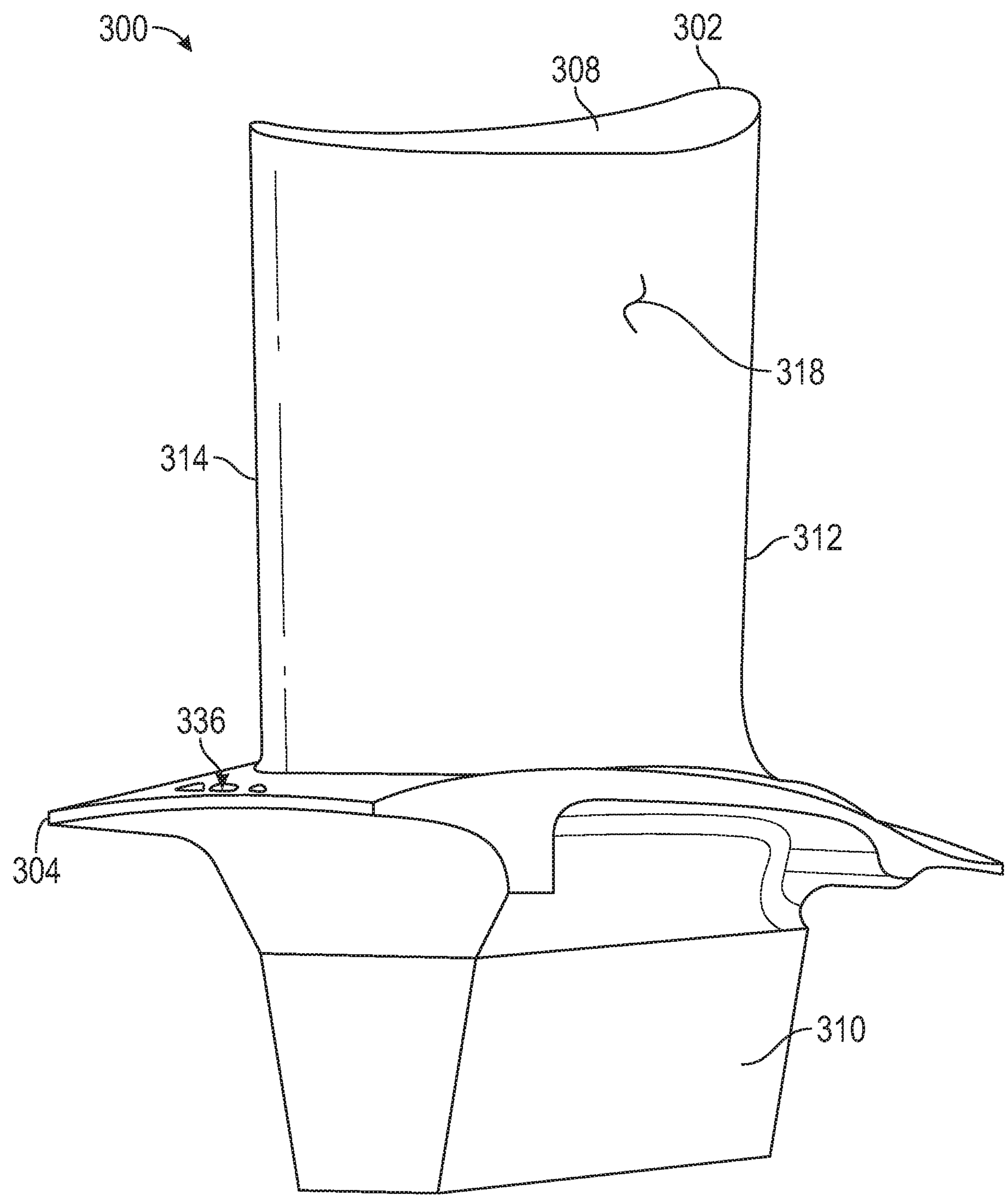
FIG. 3C is a perspective view of the airfoil of FIG. 3A, as viewing a trailing edge thereof.

Turning now to FIGS. 3A-3C, schematic illustrations of an airfoil 300 are shown. FIG. 3A is an isometric illustration of a leading edge of the airfoil 300. FIG. 3B is a cross-sectional illustration of the airfoil 300 as viewed along the line B-B shown in FIG. 3A. FIG. 3C is an isometric illustration of a trailing edge of the airfoil 300. The airfoil 300, as shown, is arranged as a blade having an airfoil body 302 that extends from a platform 304 from a root 306 to a tip 308. The platform 304 may be integrally formed with or attached to an attachment element 310, the attachment element 310 being configured to attach to or engage with a rotor disc for installation of the airfoil body 302 thereto. The airfoil body 302 extends in an axial direction A from a leading edge 312 to a trailing edge 314, and in a radial direction R from the root 306 to the tip 308. In the circumferential direction C, the airfoil body 302 extends between a pressure side 316 and a suction side 318.

As shown in FIG. 3B, illustrating a cross-sectional view of the airfoil 300, as viewed along the line B-B shown in FIG. 3A, the airfoil body 302 defines or includes a plurality of internal cavities to enable cooling of the airfoil 300. For example, as shown, the airfoil 300 includes a plurality of forward and side cooling cavities 320, 322, 324. A leading edge cavity 320 is located along the leading edge 312 of the airfoil body 302, pressure side cavities 322 are arranged along the pressure side 316 and proximate the leading edge 312, and a suction side cavity 324 is arranged along the suction side 318 and proximate the leading edge 312. In the relative middle of the airfoil body 302, the airfoil 300 includes various main body cavities 326, 328, 330, 332 and, at the trailing edge 314, a trailing edge slot 334. Some of the main body cavities may form a serpentine flow path through the airfoil 300, (e.g., cavities 328, 330, 332). Further, one or more of the main body cavities may be arranged to provide cool impinging air into the forward and side cooling cavities 320, 322, 324 (e.g., cavity 326). In some embodiments described herein, the cavity 326 may be referred to as a leading edge feed cavity. Although shown with a specific internal cooling cavity arrangement, airfoils in accordance with the present disclosure may include additional and/or alternative cavities, flow paths, channels, etc. as will be appreciated by those of skill in the art, including, but not limited to, tip cavities, serpentine cavities, trailing edge cavities, etc.

Some or all of the internal cavities 320, 322, 324, 326, 328, 330, 332 may be fed by a cool air supply located within the attachment element 310 and through the platform 304. Cooling is also provided to the platform 304, and particularly to the hot gaspath surfaces of the platform 304, as will be appreciated by those of skill in the art. For example, as shown in FIG. 3C, the platform 304 may include one or more platform cooling holes 336. The platform cooling holes 336 may be arranged as film cooling holes that expel cool air from within the platform 304 out onto a hot gaspath surface. Further, in some embodiments, as will be appreciated by those of skill in the art, the platform 304 may include one or more platform cooling holes that are arranged on side facing surfaces, e.g., between adjacent blades. The platform cooling holes 336 may be fed from a cool air source within or below the platform 304 and/or the attachment element 310.

Providing a common cooling source for both the airfoil cavities and the platform may be difficult due to limitations of manufacturing processes. For example, a core for forming a platform cooling circuit may have different thermal expansion characteristics than a core for forming a main body of an airfoil, and thus during the manufacturing process, consistent and/or efficient means for forming a complete airfoil and platform may be difficult to achieve. Accordingly, embodiments provided herein are directed to core assemblies and airfoils that enable improved manufacturing techniques and improved cooling schemes for airfoils and platforms of airfoils.

Figure 4A:
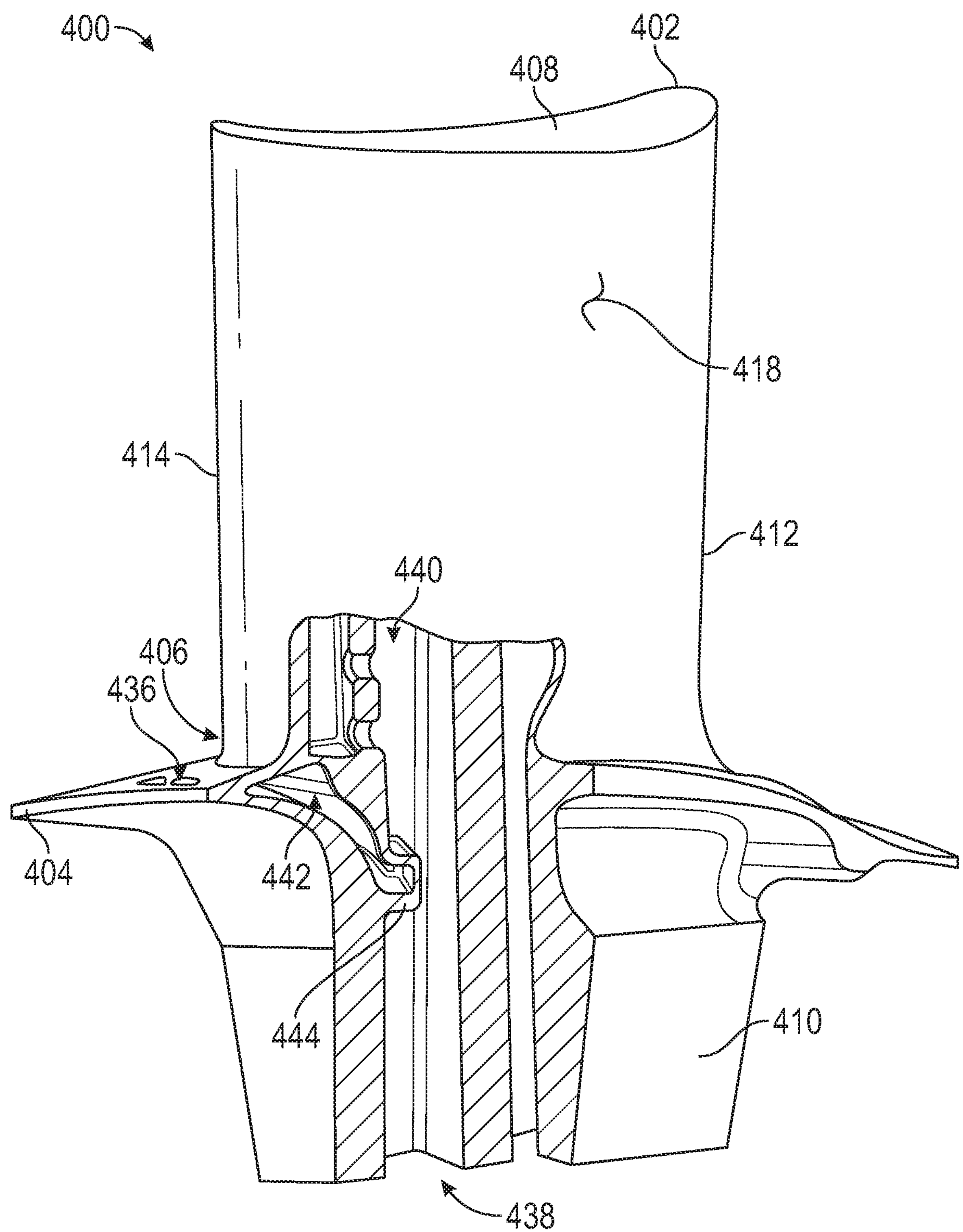
FIG. 4A is a partial cutaway, schematic illustration of an airfoil formed in accordance with an embodiment of the present disclosure, after casting, but prior to a machining process.
Figure 4B:
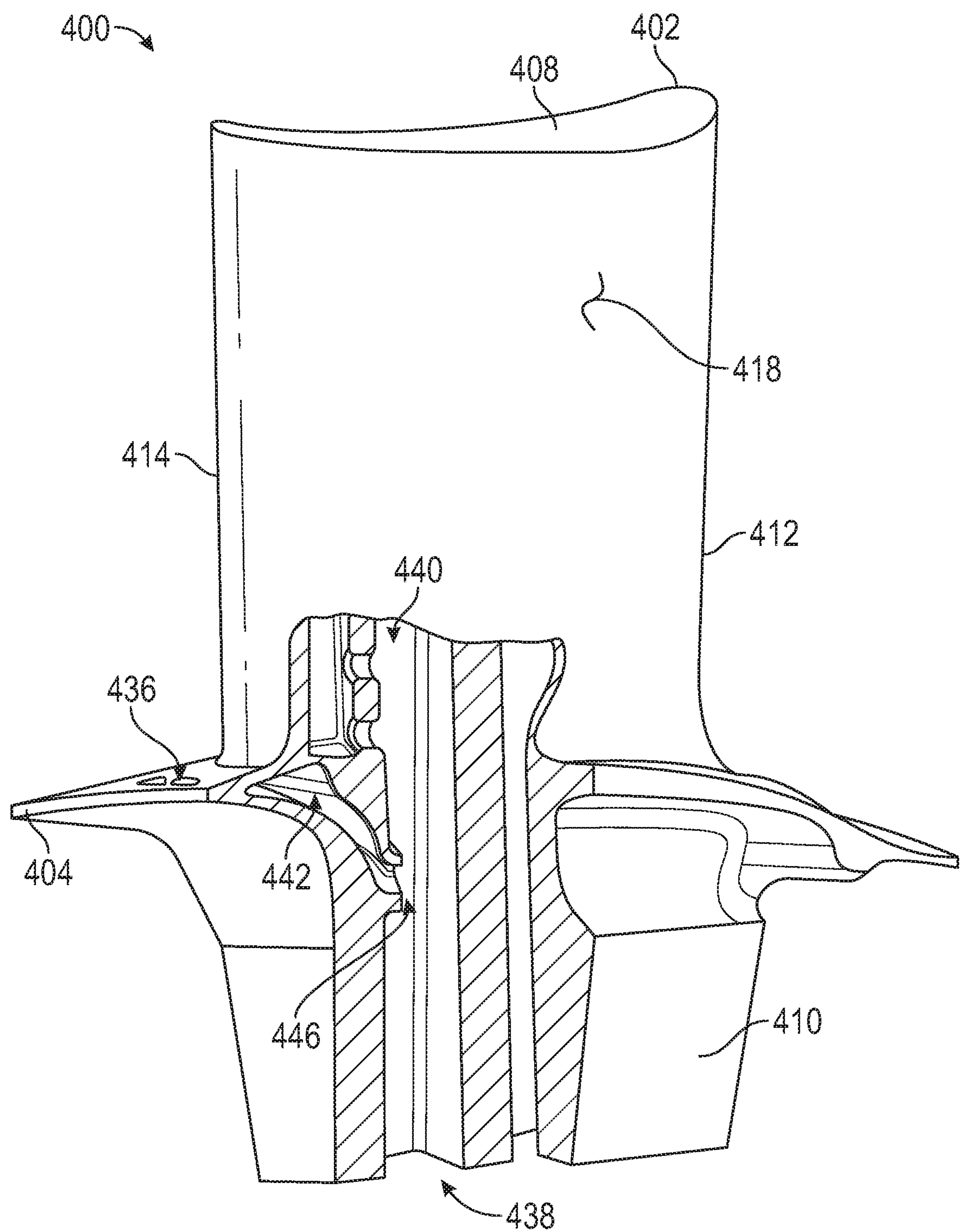
FIG. 4B is a schematic illustration of the airfoil of FIG. 4A after a machining process in accordance with an embodiment of the present disclosure.

Turning now to FIGS. 4A-4B, schematic illustrations of an airfoil 400 in accordance with an embodiment of the present disclosure are shown. FIG. 4A illustrates a formed airfoil 400 after casting, but prior to a machining process in accordance with the present disclosure, and FIG. 4B illustrates the airfoil 400 after the machining process.

The airfoil 400 is substantially similar to the airfoil 300 shown and described with respect to FIG. 3. As such, the airfoil 400 is arranged as a blade having an airfoil body 402 that extends from a platform 404 from a root 406 to a tip 408. The platform 404 may be integrally formed with or attached to an attachment element 410, the attachment element 410 being configured to attach to or engage with a rotor disc for installation of the airfoil body 402 thereto. The airfoil body 402 extends in an axial direction from a leading edge 412 to a trailing edge 414, and in a radial direction from the root 406 to the tip 408. In a circumferential direction, the airfoil body 402 extends between a pressure side (not shown in this view) and a suction side 418. The platform 404 includes one or more platform cooling holes 436, as described above.

FIGS. 4A-4B are partial cut-away views, illustrating an internal structure of a portion of the airfoil body 402, the platform 404, and the attachment element 410. As shown, the attachment element 410 includes at least one main body feed cavity 438 that is arranged to supply cooling air into the airfoil body 402, e.g., into one or more main body cavities 440. For example, the main body cavities 440 may include, but are not limited to, one or more of the internal cavities 320, 322, 324, 326, 328, 330, 332 shown in FIG. 3B. Also shown is a platform cooling circuit 442 that can supply cooling air into and through the platform 404 and out through the one or more platform cooling holes 436.

In the interim manufacturing step shown in FIG. 4A, the airfoil 400 is formed with a platform core extension element 444. The platform core extension element 444 is formed during the manufacturing process of the present disclosure to enable and/or ensure proper mating and formation of cores.

As shown in FIG. 4B, a machining process may be used to remove the platform core extension element 444. With the platform core extension element 444 removed, the main body feed cavity 438 can now supply cooling air to both the main body cavities 440 and the platform cooling circuit 442. That is, with the removal of the platform core extension element 444, a platform cooling circuit bypass 446 is formed along the main body feed cavity 438 to bleed or extract a portion of the cooling air and divert it into and through the platform cooling circuit 442. The cooling air will then be expelled out through the one or more platform cooling holes 436.

Figure 5A:
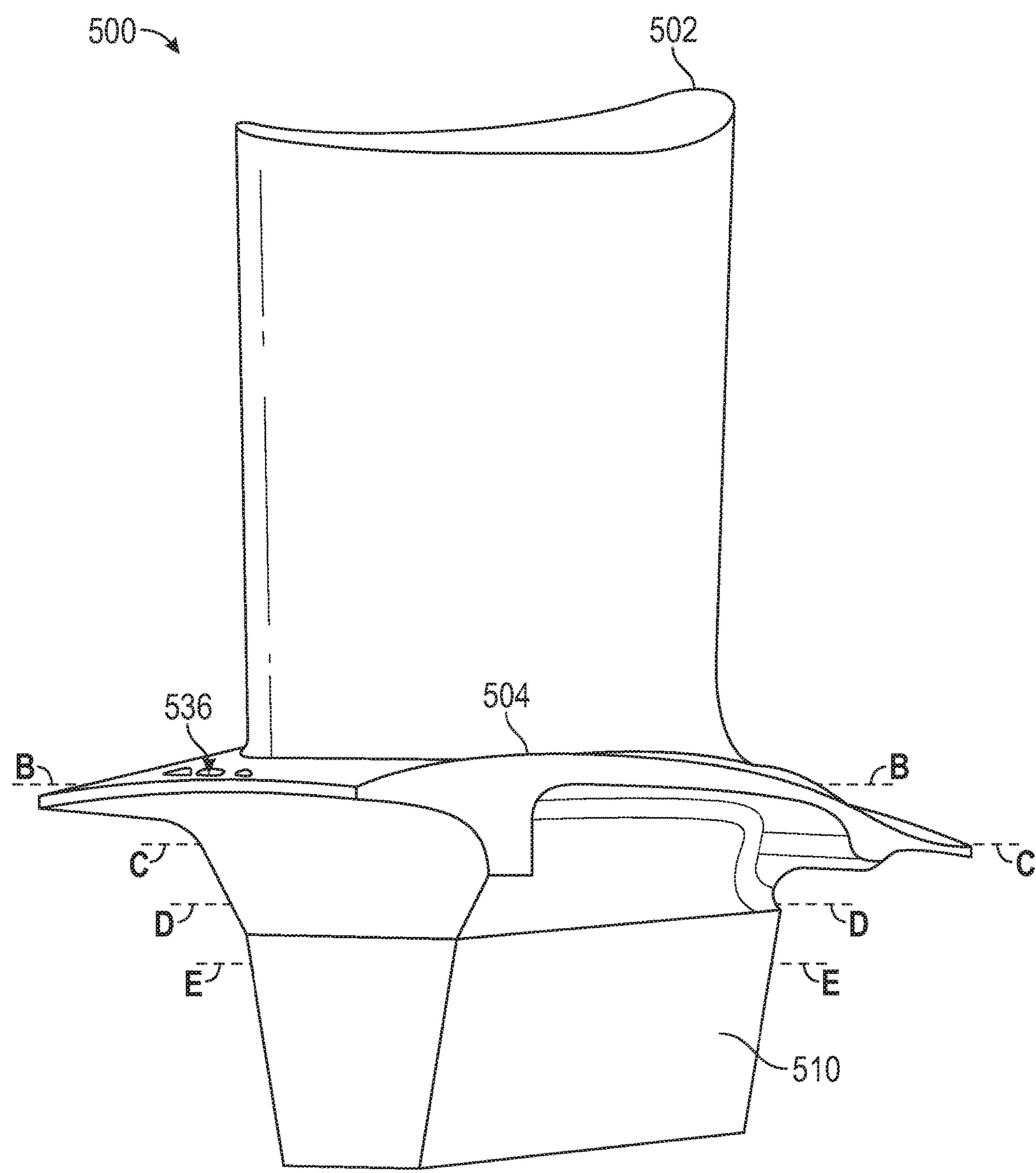
FIG. 5A is an isometric illustration of an airfoil in accordance with an embodiment of the present disclosure.
Figures 5B, 5C, 5D:
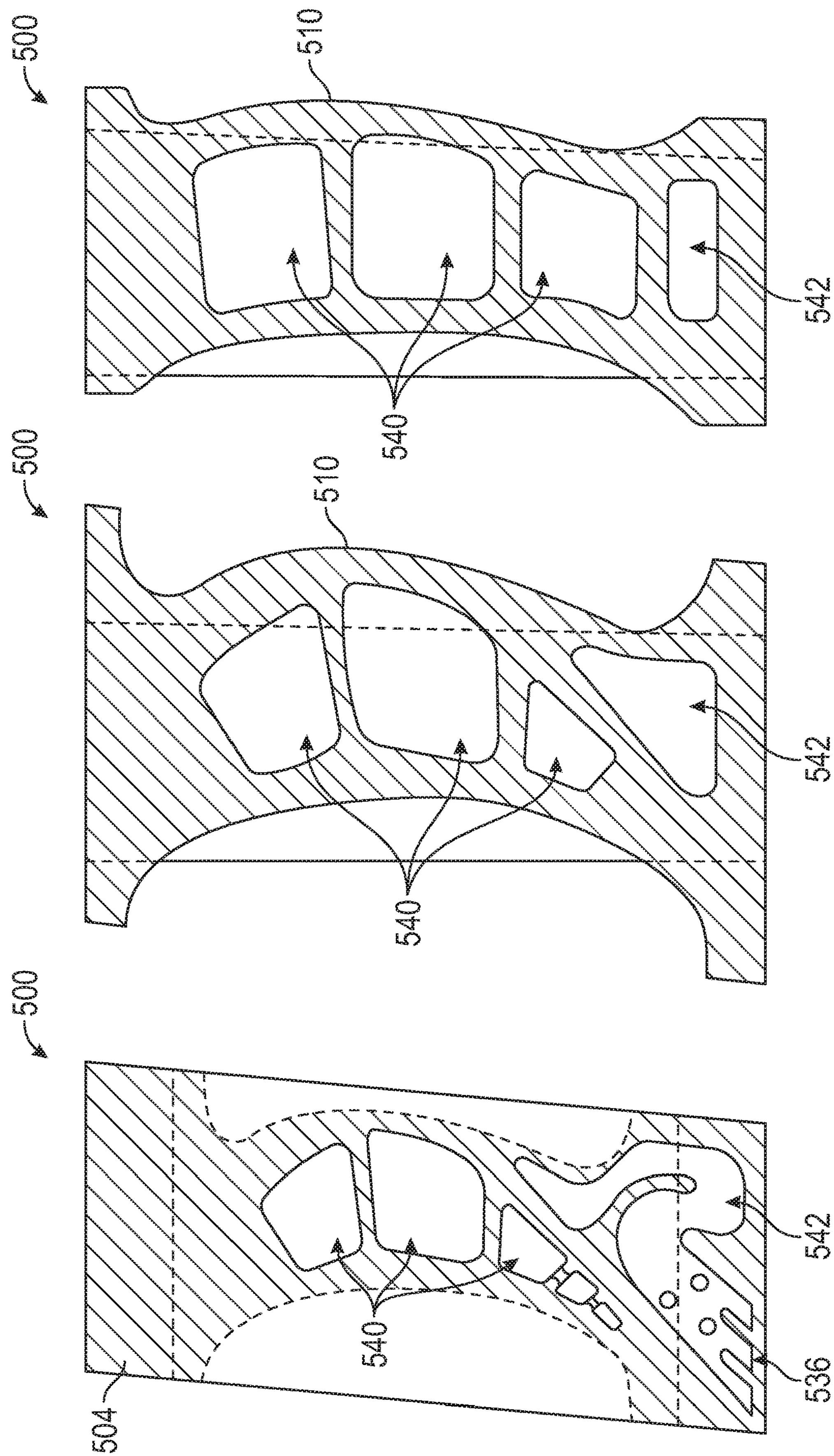
FIG. 5B is a sectional of the airfoil of FIG. 5A as viewed at the line B-B.
FIG. 5C is a sectional of the airfoil of FIG. 5A as viewed at the line C-C.
FIG. 5D is a sectional of the airfoil of FIG. 5A as viewed at the line D-D.
Figure 5E:
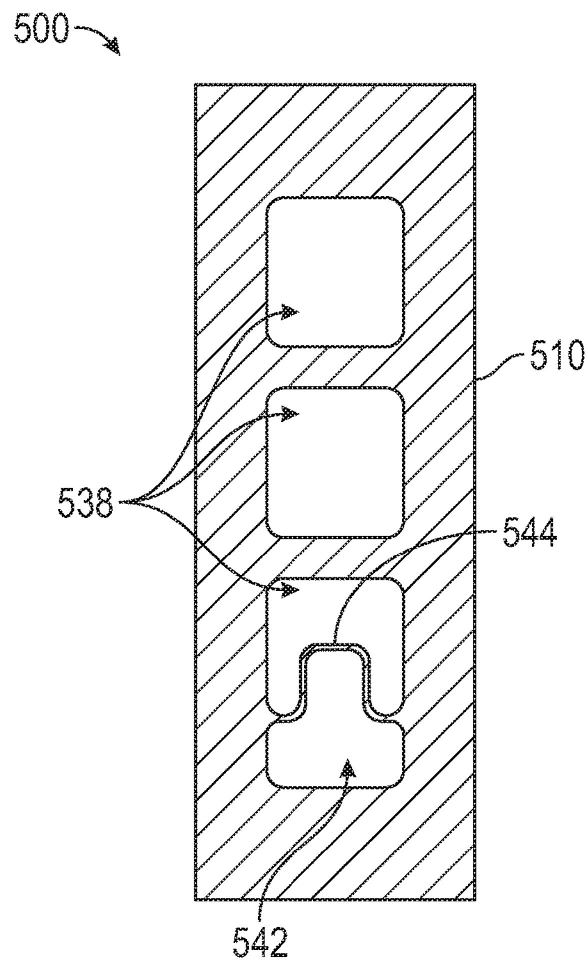
FIG. 5E is a sectional of the airfoil of FIG. 5A as viewed at the line E-E prior to a machining process of the present disclosure.
Figure 5F:
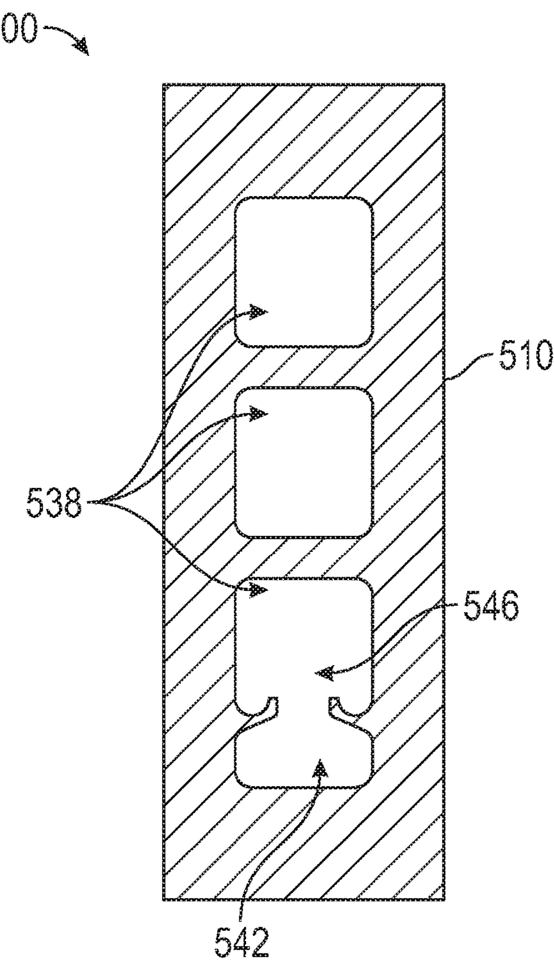
FIG. 5F is a sectional of the airfoil of FIG. 5A as viewed at the line E-E after a machining process of the present disclosure.

Turning now to FIGS. 5A-5F, schematic illustrations of an airfoil 500 in accordance with an embodiment of the present disclosure are shown. FIG. 5A is an isometric illustration of the airfoil 500 as viewed toward the trailing edge thereof, FIG. 5B is a sectional of the airfoil 500 at the line B-B, FIG. 5C is a sectional of the airfoil 500 at the line C-C, FIG. 5D is a sectional of the airfoil 500 at the line D-D, FIG. 5E is a sectional of the airfoil 500 at the line E-E, and FIG. 5F is a sectional of the airfoil 500 at the line E-E after a machining process of the present disclosure.

The airfoil 500 is substantially similar to the airfoils shown and described above. The airfoil 500 is arranged as a blade having an airfoil body 502 that extends from a platform 504 extending between a root and a tip. The platform 504 may be integrally formed with or attached to an attachment element 510, the attachment element 510 being configured to attach to or engage with a rotor disc for installation of the airfoil body 502 thereto. The airfoil body 502 extends in an axial direction between a leading edge and a trailing edge, and in a radial direction from the root to the tip. In a circumferential direction, the airfoil body extends between a pressure side and a suction side. The platform 504 includes one or more platform cooling holes 536, as described above, that fluidly connect to a platform cooling circuit. The airfoil contains one or more internal main body cavities therein With reference to FIG. 5B, the sectional illustrates the platform 504 with a plurality of main body cavities 540 and a platform cooling circuit 542 formed therein. The platform cooling circuit 542 includes one or more platform cooling holes 536, as described above and as will be appreciated by those of skill in the art. As shown in FIG. 5B, the platform cooling circuit 542 and the main body cavities 540 are separated. As the platform cooling circuit 542 and the main body cavities 540 extend radially inward through the attachment element 510, the geometries thereof change, as shown in FIGS. 5C-5D.

Referring now to FIG. 5E, main body feed cavities 538 are shown which fluidly connected to the main body cavities 540. The main body feed cavities 538 may continue radially inward to a source of cooling air when installed within a turbine section of a gas turbine engine. FIG. 5E illustrates the attachment element 510 pre-machining, but post-casting. That is, a platform core extension element 544 separates the platform cooling circuit 542 from one of the main body feed cavities 538.

As shown in FIG. 5F, which illustrates the same sectional as FIG. 5E, the platform core extension element 544 has been removed, such as by machining, and the platform cooling circuit 542 is now fluidly connected to one of the main body feed cavities 538 through a platform cooling circuit bypass 546. Advantageously, in accordance with embodiments of the present disclosure, a single cooling source can be used to supply cooling air to both the main body cavities 540 of an airfoil and also to the platform cooling circuit 542.

Figure 6:
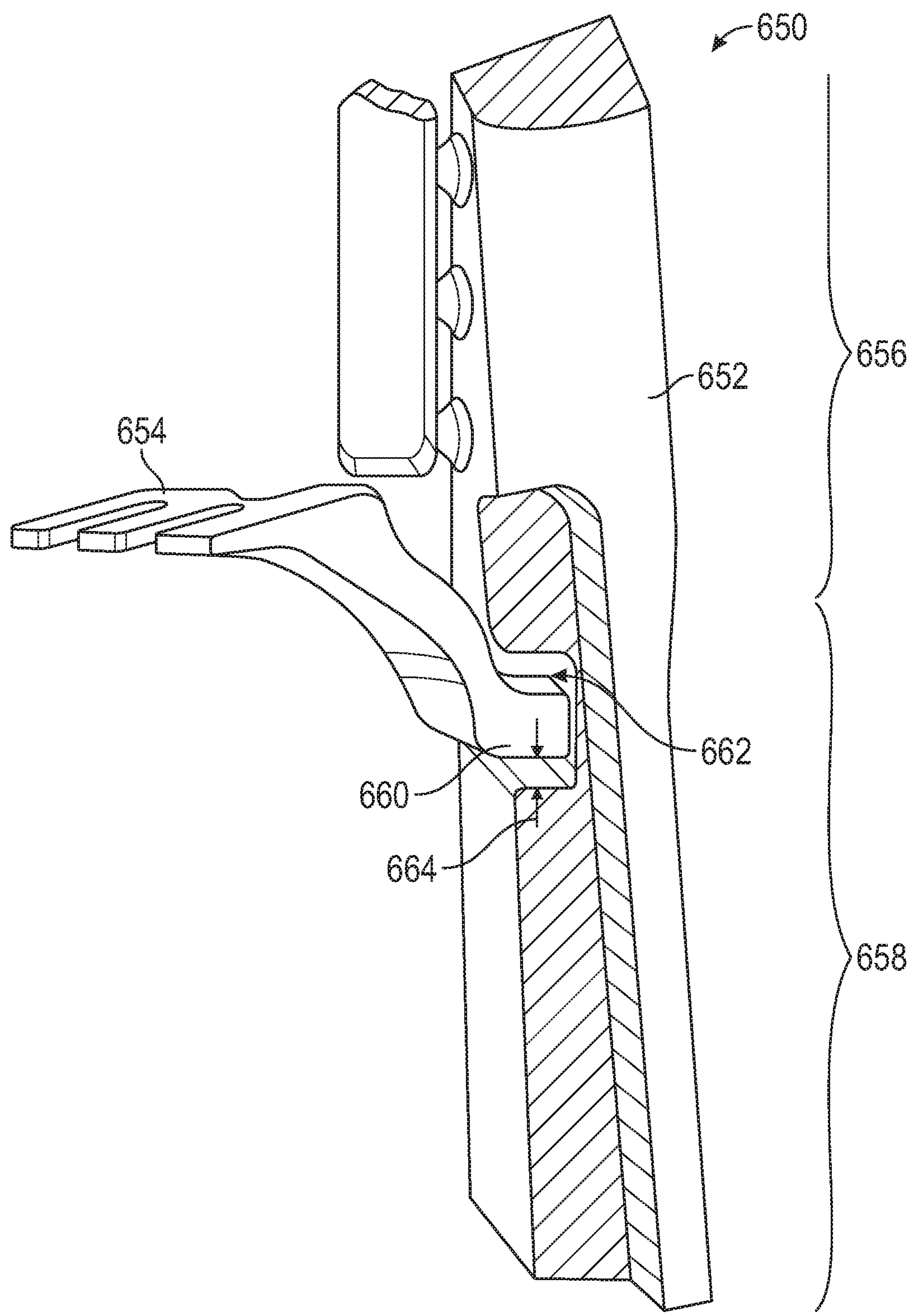
FIG. 6 is a schematic illustration of a core assembly in accordance with an embodiment of the present disclosure.

Turning now to FIG. 6, a schematic illustration of a core assembly 650 in accordance with an embodiment of the present disclosure is shown. The core assembly 650 may be used to form an airfoil in accordance with the present disclosure, such as the airfoils shown and described above.

The core assembly includes a main body core 652 and a platform circuit core 654. The main body core 652 includes an airfoil cavity core portion 656 and a feed cavity core portion 658. The airfoil cavity core portion 656 can include one or more cores that are arranged and positioned to enable the formation of one or more cavities within a formed airfoil body. The feed cavity core portion 658 is arranged to aid in the formation of a platform and attachment element and form feed cavities therein and/or therethrough. The platform circuit core 654 is arranged to form a platform cooling circuit within a platform of the formed airfoil, and can include various features as will be appreciated by those of skill in the art (e.g., features to form one or more platform cooling holes).

As shown, the platform circuit core 654 includes a platform core extension 660. The platform core extension 660 is arranged to fit within a notch 662 of the feed cavity core portion 658 of the main body core 652. That is, the feed cavity core portion 658 of the main body core 652 is formed with the notch 662 therein, with the notch 662 positioned to form platform cooling circuit bypass in a formed airfoil.

The dimensions of the platform core extension 660 and the notch 662 are selected to allow for a gap 664 to be present when the platform core extension 660 is inserted into the notch 662 when casting an airfoil. The gap 664 allows for different thermal expansion coefficients of the platform circuit core 654 and the main body core 652 during the casting process. Thus, failure and/or damage may be avoided during the formation of the airfoil at the location of the joining of the platform circuit core 654 and the main body core 652. The gap 664 allows for some amount of casting material to enter therein, thus forming a platform core extension element (e.g., as shown in FIGS. 4A and 5E) which may be subsequently removed by machining or other process, as will be appreciated by those of skill in the art. In accordance with an example embodiment, the gap is between about 0.015 inches and about 0.050 inches.

Although the platform core extension 660 in FIG. 6 is shown with a substantially squared cross-section, such geometry is not to be limiting. For example, a cylindrical or conical shape may be employed without departing from the scope of the present disclosure. The geometric shape of the platform core extension may be arranged to achieve specific design considerations or may be selected for other reasons. For example, a conical shape may result in a more smooth transition in the formed cooling cavities (e.g., decreased inlet losses). Other geometries may provide for improved structure, such as ovals, smooth, filleted shapes, etc. Accordingly, the geometry of the connection and engagement at the notch is not to be limiting.

Further, the shape of the formed opening, by removal of the platform core extension element, may take any desired geometric shapes, and may be defined, in part, by the shape of the notch and the extension that engages therewith. Moreover, the machining process may be selected or performed to achieve a desired transition at the junction between the main body feed cavity and the platform cooling circuit. Thus, the illustrative embodiments shown and described herein are merely for example and are not to be limiting.

Figure 7:
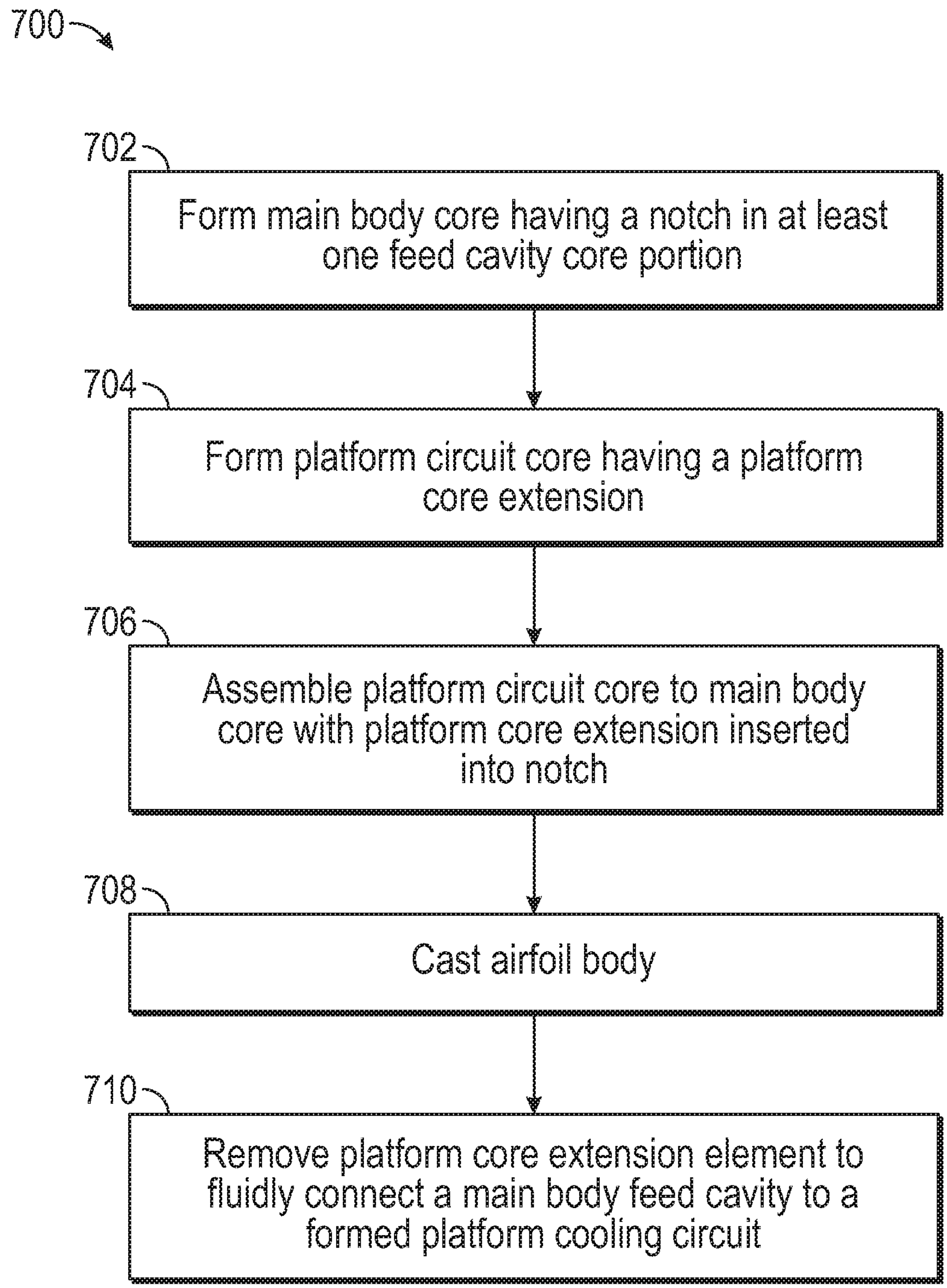
FIG. 7 is a flow process for manufacturing an airfoil in accordance with an embodiment of the present disclosure.

Turning now to FIG. 7, a flow process 700 for forming an airfoil in accordance with an embodiment of the present disclosure is shown. The flow process may be used to form an airfoil having a platform cooling circuit that is fluidly connected to a main body feed cavity, as shown and described above.

At block 702, a main body core is formed, with the main body core being configured to enable casting of an airfoil body having internal cavities and main body feed cavities formed within and/or through a platform and an attachment element of the airfoil. At least one feed cavity core portion of the main body core is formed with a notch, such as shown and described above.

At block 704, a platform circuit core is formed for forming a platform cooling circuit within the platform of the formed airfoil. The platform circuit core is formed with a platform core extension to enable engagement and assembly with the main body core.

At block 706, the platform circuit core is assembled to the main body core with the platform core extension inserted in or engaged with the notch of the notch of the main body core. When assembled, a gap is formed between the platform core extension and the surfaces of the main body core defining the notch. The gap is provided to allow for changes in shape/size of the main body core and/or the platform core extension due to thermal influences during a casting process.

At block 708, an airfoil is cast using the assembled platform circuit core and main body core. During the casting process, a platform core extension element is formed within the gap between the platform core extension and the surfaces of the main body core defining the notch.

At block 710, the platform core extension element is removed to form a platform cooling circuit bypass. That is, the platform core extension element is removed to fluidly connect a main body feed cavity to a formed platform cooling circuit.

Figure 8:
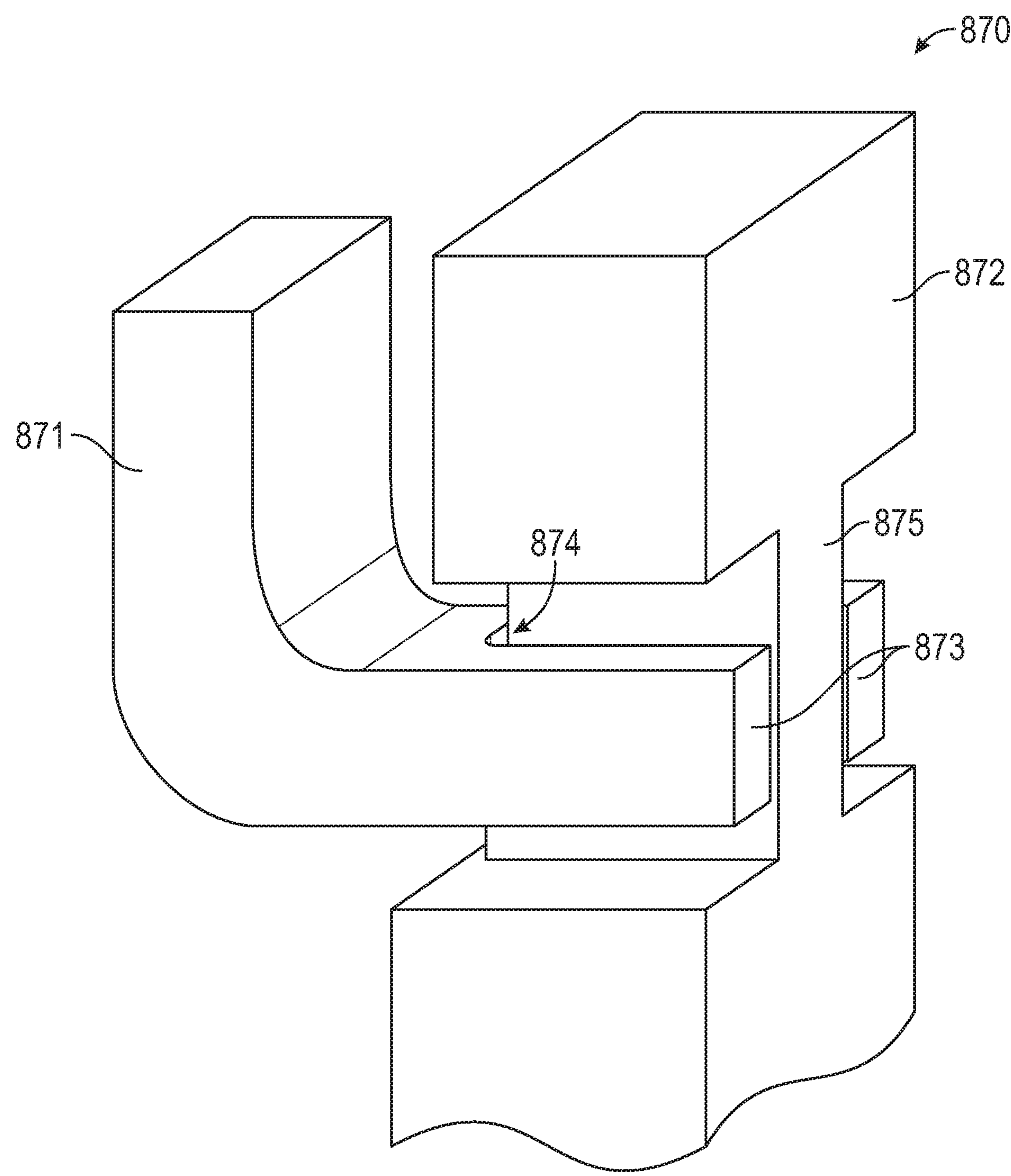
FIG. 8 is a schematic illustration of a core assembly in accordance with an embodiment of the present disclosure.

Turning now to FIG. 8, a schematic illustration of a core assembly 870 in accordance with an embodiment of the present disclosure is shown. The core assembly 870 may be used to form airfoils having features as shown and described above. In this arrangement, the core assembly 870 includes a platform circuit core 871 and a main body core 872. The platform circuit core 871 includes a platform core extension 873 defining a notch 874 to receive a portion 875 of the main body core 872 therein. The end result of such configuration is an airfoil similar to that shown and described above. A gap may be present between the notch 874 and the portion 875 of the main body core 872, as described above. As shown, the portion 875 of the main body core 872 may be a reduced thickness portion of the main body core 872 such that the resulting joined main body core 872 and platform circuit core 871 do not occupy additional space or volume as compared to the embodiments shown and described above.

It is noted that FIG. 8 illustrates an alternative configuration to the prior described embodiments. Those of skill in the art will appreciate that further arrangements may be possible without departing from the scope of the present disclosure. For example, in some embodiments, the platform circuit core may define a notch at an end thereof, with a core extension extending from a side of the main body core (i.e., the opposite of the arrangement shown in FIG. 6).

Figure 9A:
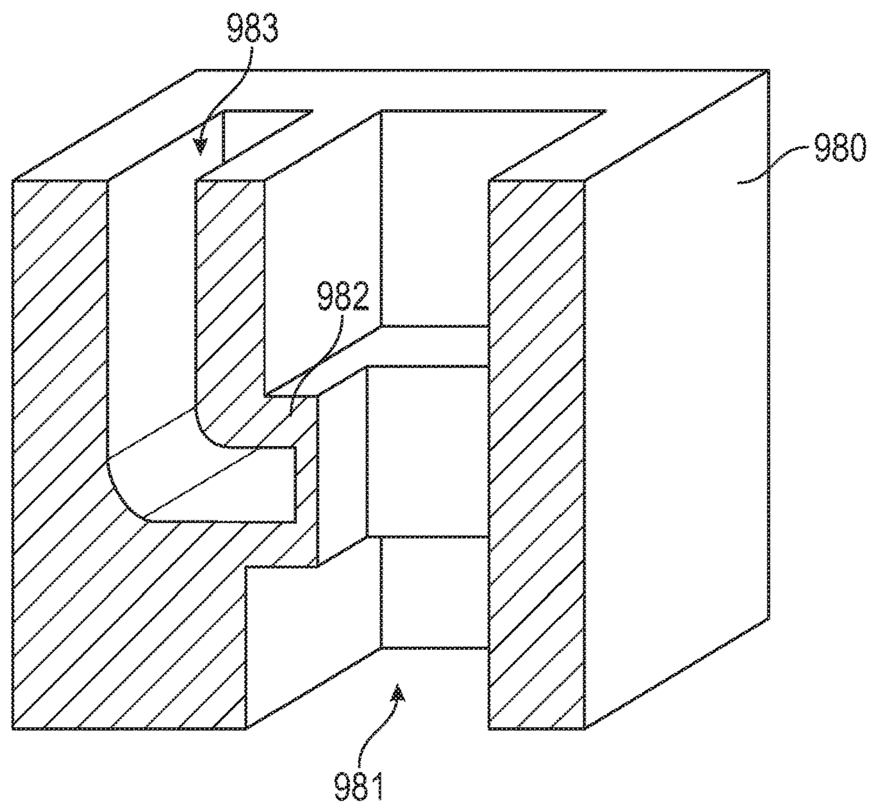
FIG. 9A is a partial-sectional view of an airfoil in accordance with an embodiment of the present disclosure prior to a machining process.
Figure 9B:
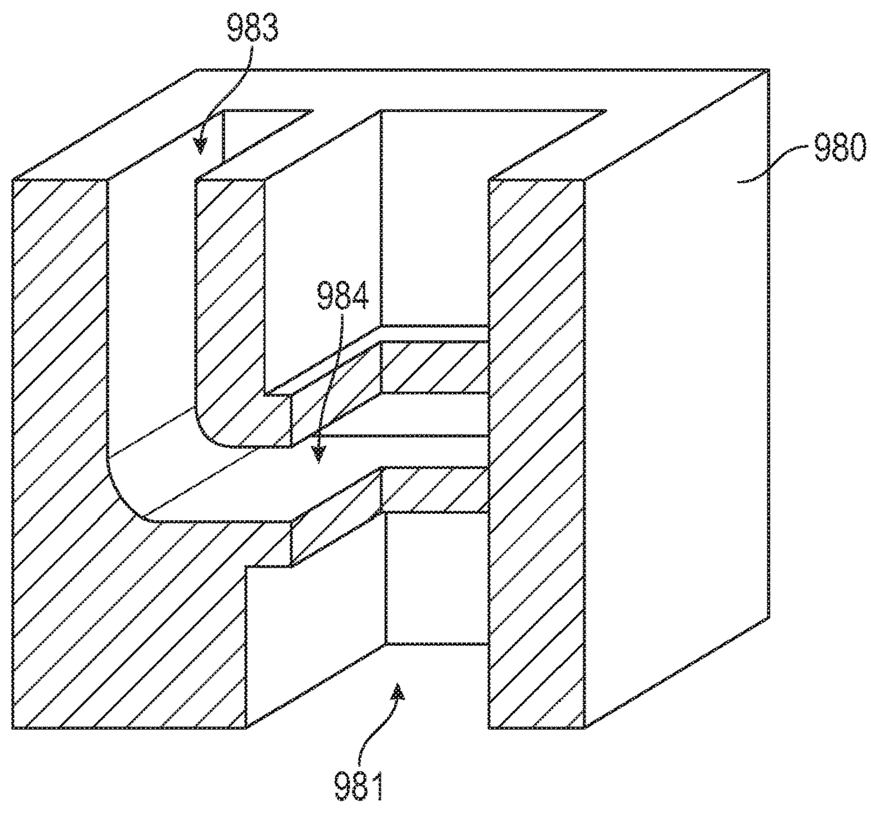
FIG. 9B is a partial-sectional view of the airfoil of FIG. 9A after a machining process in accordance with an embodiment of the present disclosure.

Turning now to FIGS. 9A-9B, schematic illustrations of an airfoil 980 in accordance with an embodiment of the present disclosure are shown. FIG. 9A is a partial-sectional view of the airfoil 980, prior to a machining process. FIG. 9B is a partial-sectional view of the airfoil 980, after a machining process. The airfoil 980 may be formed using a core assembly similar to that shown in FIG. 8. The illustration in FIGS. 9A-9B may be of a portion of an attachment element of the airfoil 980, similar to that shown and described above.

As shown, a main body feed cavity 981 is formed within the airfoil 980 and my fluidly connect to one or more main body cavities of the airfoil 980. The main body feed cavity 981 may extend, downward on the page, to a source of cooling air when installed within a turbine section of a gas turbine engine. FIG. 9A illustrates the airfoil 980 pre-machining, but post-casting. In this illustration, a platform core extension element 982 separates a platform cooling circuit 983 from the main body feed cavity 981.

FIG. 9B illustrates the same sectional as FIG. 9A, but the platform core extension element 982 has been removed, such as by machining, and the platform cooling circuit 983 is now fluidly connected to the main body feed cavity 981 through a platform cooling circuit bypass 984. Advantageously, in accordance with embodiments of the present disclosure, a single cooling source can be used to supply cooling air to both the main body cavities of an airfoil and also to the platform cooling circuit 983.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for manufacturing an airfoil of a gas turbine engine, the method comprising:

forming a main body core, the main body core including a feed cavity core portion, the main body core configured to form at least a part of an airfoil including an airfoil body, a platform, and an attachment element;

forming a platform circuit core having a platform core extension, wherein the platform circuit core is configured to form a cooling circuit in the platform, wherein at least one of the feed cavity core portion and the platform core extension comprises a notch;

assembling the platform circuit core to the main body core such that the platform core extension engages with the feed cavity core portion at the notch;

casting an airfoil with casting material using the assembled platform circuit core and main body core such that the casting material flows into and enters a space at the notch and forms a platform core extension element that is formed of casting material at the location of the notch; and removing the platform core extension element.

2. The method of claim 1, wherein a gap is formed between the platform core extension and the feed cavity core portion when engaged.

3. The method of claim 2, wherein the platform core extension element is formed by material of the casting material located within the gap.

4. The method of claim 2, wherein the gap is between 0.015 inches and 0.050 inches.

5. The method of claim 1, wherein removal of the platform core extension element comprises a machining process.

6. The method of claim 1, wherein removal of the platform core extension element fluidly connects a formed main body feed cavity and a formed platform cooling circuit.

7. The method of claim 1, wherein the notch is formed in the feed cavity core portion and the platform core extension engages within the notch of the feed cavity core portion.

8. The method of claim 1, wherein the notch is formed within the platform core extension and the feed cavity core portion engages within the notch of the platform core extension.

9. The method of claim 8, wherein the feed cavity core portion comprises a reduced width portion that engages with the notch of the platform core extension.

10. A core assembly for forming an airfoil of a gas turbine engine, the core assembly comprising:

a main body core, the main body core including at least one feed cavity core portion, the main body core configured to form an airfoil including an airfoil body, a platform, and an attachment element; and a platform circuit core having a platform core extension, wherein at least one of the at least one feed cavity core portion and the platform core extension comprises a notch;

wherein the platform core extension is engageable with the at least one feed cavity core portion at the notch and a gap is formed between the platform core extension and a surface of the at least one feed cavity core portion at the notch, wherein the gap is configured to receive casting material during a formation of the airfoil, and wherein the platform core extension and the at least one feed cavity core portion are configured to receive a casting material within the gap at the notch to form a platform core extension element that is removable after using the core assembly to form the airfoil.

11. The core assembly of claim 10, wherein the gap is between 0.015 inches and 0.050 inches.

12. The core assembly of claim 10, wherein the notch is formed in the at least one feed cavity core portion and the platform core extension engages within the notch of the at least one feed cavity core portion.

13. The core assembly of claim 10, wherein the notch is formed within the platform core extension and the at least one feed cavity core portion engages within the notch of the platform core extension.

14. The core assembly of claim 13, wherein the at least one feed cavity core portion comprises a reduced width portion that engages with the notch of the platform core extension.

* * * * *